US008977570B2

(12) United States Patent
Hammad

(10) Patent No.: US 8,977,570 B2
(45) Date of Patent: Mar. 10, 2015

(54) SYSTEM AND METHOD INCLUDING CHIP-BASED DEVICE PROCESSING FOR TRANSACTION

(71) Applicant: Visa International Service Association, San Francisco, CA (US)

(72) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/899,523

(22) Filed: May 21, 2013

(65) Prior Publication Data
US 2013/0254112 A1  Sep. 26, 2013

Related U.S. Application Data

(63) Continuation of application No. 13/083,129, filed on Apr. 8, 2011, now Pat. No. 8,473,414.

(60) Provisional application No. 61/322,745, filed on Apr. 9, 2010.

(51) Int. Cl.
G06Q 40/00 (2012.01)
G06Q 20/00 (2012.01)
G06Q 20/40 (2012.01)

(52) U.S. Cl.
CPC ............. G06Q 20/40 (2013.01); G06Q 40/00 (2013.01); G06Q 20/00 (2013.01)
USPC .................. 705/44; 705/35; 705/41; 705/75; 705/76

(58) Field of Classification Search
None
See application file for complete search history.

(56) References Cited

U.S. PATENT DOCUMENTS

| 5,999,937 | A | 12/1999 | Ellard |
| 6,330,021 | B1* | 12/2001 | Devaux ..................... 348/14.04 |
| 6,427,151 | B1 | 7/2002 | Chan et al. |
| 6,678,666 | B1* | 1/2004 | Boulware ....................... 705/66 |
| 6,792,536 | B1* | 9/2004 | Teppler ........................ 713/178 |
| 6,857,566 | B2 | 2/2005 | Wankmueller |
| 7,379,919 | B2* | 5/2008 | Hogan et al. ................... 705/64 |
| 7,639,116 | B2* | 12/2009 | Saunders ..................... 340/5.61 |

(Continued)

FOREIGN PATENT DOCUMENTS

KR  10-2003-0080407   10/2003
WO  WO 9840493 A1 *  9/1998  ............. C12N 15/49

(Continued)

OTHER PUBLICATIONS

International Publication No. WO 2011/019751 A2; Rigby, Mark; Aug. 10, 2012, 35-pages.*

(Continued)

Primary Examiner — Gregory Johnson
(74) Attorney, Agent, or Firm — Kilpatrick Townsend & Stockton LLP

(57) ABSTRACT

Present embodiments are directed to a server computer. The server computer establishes a first channel of communication to receive payment device data in a first format (e.g., chip type) and establishes a second channel to receive the payment device data in a second format (e.g., legacy type). The server computer receives an authorization request message in the second format from a merchant and generates a new authorization request message in the first format. The server computer then forwards the new authorization request to the issuer for approval.

20 Claims, 8 Drawing Sheets

(56) References Cited

U.S. PATENT DOCUMENTS

| | | | |
|---|---|---|---|
| 7,874,480 B2* | 1/2011 | Routhenstein | 235/380 |
| 8,364,591 B2* | 1/2013 | Rigby et al. | 705/40 |
| 8,473,414 B2* | 6/2013 | Hammad | 705/44 |
| 8,650,118 B2* | 2/2014 | Balasubramanian et al. | 705/38 |
| 2001/0032878 A1* | 10/2001 | Tsiounis et al. | 235/379 |
| 2002/0030579 A1* | 3/2002 | Albert et al. | 340/5.9 |
| 2002/0120584 A1* | 8/2002 | Hogan et al. | 705/67 |
| 2002/0128977 A1* | 9/2002 | Nambiar et al. | 705/64 |
| 2003/0018587 A1* | 1/2003 | Althoff et al. | 705/64 |
| 2003/0074209 A1* | 4/2003 | Tobin | 705/1 |
| 2003/0200184 A1* | 10/2003 | Dominguez et al. | 705/78 |
| 2004/0019564 A1* | 1/2004 | Goldthwaite et al. | 705/44 |
| 2004/0044739 A1* | 3/2004 | Ziegler | 709/213 |
| 2004/0117250 A1* | 6/2004 | Lubow et al. | 705/14 |
| 2004/0117300 A1* | 6/2004 | Jones et al. | 705/39 |
| 2004/0159700 A1* | 8/2004 | Khan et al. | 235/380 |
| 2004/0210531 A1* | 10/2004 | Barron et al. | 705/44 |
| 2004/0211835 A1* | 10/2004 | Tournemille et al. | 235/441 |
| 2004/0230489 A1* | 11/2004 | Goldthwaite et al. | 705/26 |
| 2005/0038736 A1 | 2/2005 | Saunders | |
| 2005/0119978 A1* | 6/2005 | Ates | 705/67 |
| 2005/0171898 A1* | 8/2005 | Bishop et al. | 705/39 |
| 2005/0240478 A1* | 10/2005 | Lubow et al. | 705/14 |
| 2005/0242173 A1* | 11/2005 | Suzuki | 235/380 |
| 2006/0020542 A1* | 1/2006 | Litle et al. | 705/40 |
| 2006/0165060 A1* | 7/2006 | Dua | 370/352 |
| 2007/0094085 A1 | 4/2007 | Redmond et al. | |
| 2007/0294182 A1 | 12/2007 | Hammad | |
| 2008/0029593 A1 | 2/2008 | Hammad et al. | |
| 2008/0040274 A1* | 2/2008 | Uzo | 705/44 |
| 2008/0054065 A1* | 3/2008 | D'Angelo et al. | 235/380 |
| 2008/0065553 A1* | 3/2008 | Faith et al. | 705/64 |
| 2008/0120236 A1* | 5/2008 | Faith et al. | 705/44 |
| 2008/0275819 A1* | 11/2008 | Rifai | 705/44 |
| 2009/0019282 A1* | 1/2009 | Arditti et al. | 713/168 |
| 2009/0150288 A1* | 6/2009 | Bishop et al. | 705/44 |
| 2009/0157518 A1* | 6/2009 | Bishop et al. | 705/19 |
| 2009/0173782 A1* | 7/2009 | Muscato | 235/379 |
| 2009/0177563 A1* | 7/2009 | Bernstein et al. | 705/30 |
| 2009/0198618 A1* | 8/2009 | Chan et al. | 705/66 |
| 2009/0234760 A1* | 9/2009 | Walter | 705/30 |
| 2009/0281927 A1* | 11/2009 | Aliabadi et al. | 705/27 |
| 2009/0289107 A1* | 11/2009 | Prentice | 235/380 |
| 2010/0078472 A1* | 4/2010 | Lin et al. | 235/379 |
| 2010/0088237 A1 | 4/2010 | Wankmueller | |
| 2010/0153267 A1* | 6/2010 | Ghaidan et al. | 705/41 |
| 2010/0179909 A1* | 7/2010 | Dana | 705/67 |
| 2010/0211422 A1 | 8/2010 | Zanzot et al. | |
| 2010/0274721 A1 | 10/2010 | Hammad | |
| 2010/0312626 A1* | 12/2010 | Cervenka | 705/14.17 |
| 2011/0022521 A1* | 1/2011 | Collinge et al. | 705/67 |
| 2011/0101093 A1* | 5/2011 | Ehrensvard | 235/380 |
| 2011/0101109 A1* | 5/2011 | Bona et al. | 235/492 |
| 2011/0125642 A1* | 5/2011 | Kamal | 705/44 |
| 2011/0140841 A1* | 6/2011 | Bona et al. | 340/5.83 |
| 2011/0178903 A1* | 7/2011 | Adams et al. | 705/30 |
| 2011/0179494 A1* | 7/2011 | Adams et al. | 726/26 |
| 2011/0208656 A1* | 8/2011 | Alba et al. | 705/65 |
| 2011/0246369 A1* | 10/2011 | De Oliveira et al. | 705/64 |
| 2011/0258117 A1* | 10/2011 | Ahmad et al. | 705/44 |
| 2011/0276487 A1* | 11/2011 | Hammad | 705/44 |
| 2011/0302646 A1* | 12/2011 | Ronda et al. | 726/9 |
| 2012/0072350 A1* | 3/2012 | Goldthwaite et al. | 705/44 |
| 2013/0254112 A1* | 9/2013 | Hammad | 705/44 |

FOREIGN PATENT DOCUMENTS

| | | |
|---|---|---|
| WO | 2008/059465 | 5/2008 |
| WO | 2011/019751 A2 | 8/2012 |

OTHER PUBLICATIONS

International Search Report and Written Opinion mailed Feb. 23, 2011 in PCT/US2010/045071, 10 pages.

* cited by examiner

SYSTEM AND METHOD INCLUDING CHIP-BASED DEVICE PROCESSING FOR TRANSACTION

The present application is a continuation of U.S. patent application Ser. No. 13/083,129, filed on Apr. 8, 2011, which claims priority to U.S. Provisional Application No. 61/322,745, filed on Apr. 9, 2010 all of which are herein incorporated by reference in their entirety for all purposes

BACKGROUND

As new types of payment devices are developed for consumers, new types of mechanisms are also developed to read those devices. For example, magnetic stripe transactions are well known and widely used. These types of transactions can be referred to in some cases as legacy transactions providing account information in legacy format. Alternatively, an integrated circuit (IC) chip card, such as the type that can be used to conduct contactless (e.g., PayWave™) transactions, can include account information in a chip type format.

Data on a magnetic stripe is limited, which means that the amount of data that can be sent in an authorization request message in a legacy format is also limited. On an IC chip card or other portable payment device employing a chip, more financial information can be stored than on a magnetic stripe, which means that chip type transactions can contain more data than magnetic stripe transactions. If more data is permitted during a transaction, the transaction can be made more secure for the user of the payment device.

With the emergence of contactless type payment cards and phones as payment devices, the availability of payment devices with IC chips is increasing. Unfortunately, many online merchants still format data as magnetic stripe type transactions, because they have not yet converted to data formats for chip type transactions. While transactions can still be conducted using chip type cards if a consumer manually inputs account information into a client computer or the like, the merchant will still process the transaction as a legacy magnetic stripe transaction instead of a chip card type transaction. Consequently, many of the security features and other features of chip type cards cannot be utilized by such merchants.

It would be desirable to provide for methods which can allow merchants and others to realize the benefits of transactions conducted with portable devices containing chips, without requiring merchants and others to make changes to their computer systems.

Embodiments of the invention address these and other problems, both individually and collectively.

BRIEF SUMMARY

Embodiments of the invention are directed to methods, systems, and devices for processing transactions.

One embodiment of the invention is directed to a server computer comprising: a processor; a computer readable medium coupled to the processor, wherein the computer readable medium includes code executable by the processor for implementing a method comprising: receiving a first authorization request from a merchant through a communication channel, wherein the first authorization request message is in a first format; creating a second authorization request message corresponding to the first authorization request message, wherein the second authorization request message is in a chip type format; and forwarding the second authorization request message to an issuer for approval.

Another embodiment of the invention is directed to a method comprising: receiving a first authorization request message from a merchant through a first communication channel, wherein the first authorization request message is in a first format; creating a second authorization request message corresponding to the first authorization request message, wherein the second authorization request message is in a chip type format; and forwarding the second authorization request message to an issuer.

Another embodiment of the invention is directed to a client computer comprising: a processor, and a computer readable medium coupled to the processor, the computer readable medium comprising code, executable by the processor, for implementing a method comprising: receiving account information from a portable device, wherein the portable device comprises a chip storing the account information; establishing a secure communications channel with a remote server computer; and forwarding the account information associated with an account to the server computer, wherein the server computer thereafter receives a first authorization request message from a merchant for a transaction, and then sends a second authorization request message for the transaction to the issuer in a chip type data format to the issuer.

Another embodiment of the invention is directed to a method comprising receiving account information from a portable device, wherein the portable device comprises a chip storing the account information; establishing a secure communications channel with a remote server computer; and forwarding the account information associated with an account to the server computer, wherein the server computer thereafter receives a first authorization request message from a merchant for a transaction, and then sends a second authorization request message for the transaction to the issuer in a chip type data format to the issuer.

These and other embodiments of the invention are described in further detail below.

DETAILED DESCRIPTION

Figure 1:
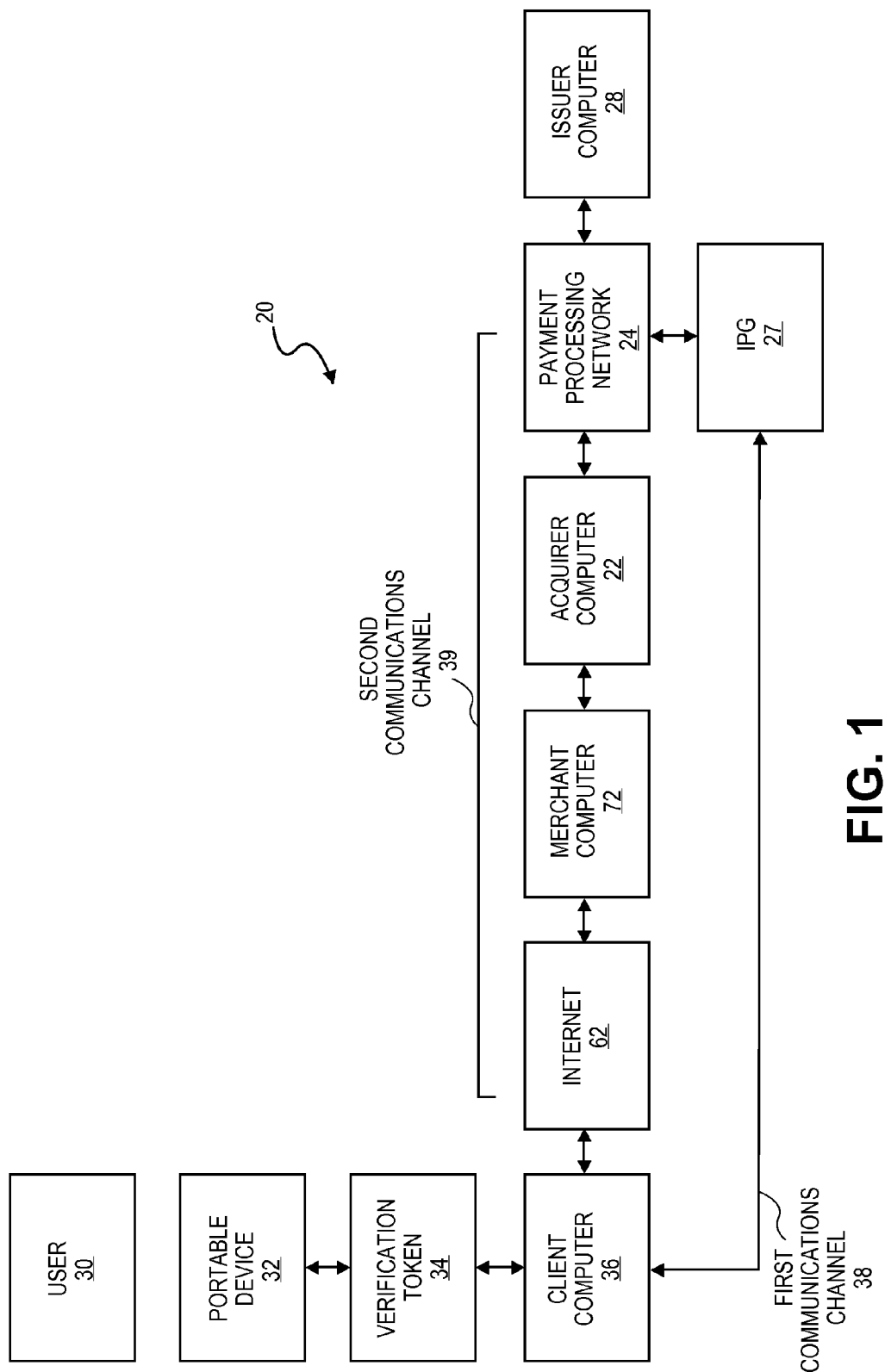
FIG. 1 shows a block diagram of a system according to an embodiment of the invention.

The following disclosure provides exemplary systems and methods for processing a purchase transaction, using authorization messages with respectively different data formats and different data elements. One authorization request message may be in a magnetic stripe transaction format, while the other authorization request message may be in a chip type format.

In one embodiment of the invention, a consumer establishes a first secure communications channel with a payment processing network server computer. The first communications channel can be established between a client computer and the server computer. The consumer then provides account information from a chip in a portable device (e.g., a contactless payment card) to the client computer, via a verification token associated with the client computer. The verification token can be within or connected to the client computer. The account information can be stored on the portable device in an integrated circuit (IC) chip in the portable device.

When the account information is received in chip type format at the payment processing network server computer, the server computer can then generate a verification value. The server computer can also store the account information in a database for later use. Chip-type account information may include data elements such as cryptograms and variable data elements (e.g., counters). Magnetic stripe account information does not include cryptograms or variable data elements such as counters. Once generated, the server computer can transmit the verification value to the client computer through the first communications channel.

Before or after the consumer receives the verification value, the consumer then initiates a transaction with a merchant such as an online merchant. During the transaction, the consumer provides his payment information to a check out page on the merchant's website. The merchant's computer then generates an authorization request message in a conventional magnetic stripe format, because the merchant computer may not be able to format data in a chip type format and has no way of receiving the data from the chip in the portable device. The authorization request message can also include the verification value received from the payment processing network server computer.

The merchant sends a first authorization request message to an acquirer, which forwards the first authorization request message to the payment processing network. The payment processing network server computer then receives the first authorization message and generates a second authorization message in chip type format. The second authorization message also includes the consumer's payment information in a chip type format. The verification value appended to the legacy formatted message can be used to identify the consumer's stored chip type format payment information, which was previously stored by the payment processing network server computer.

Once the second authorization message is generated by the payment processing network server computer, it is forwarded to the issuer of the user's portable device. The issuer can then decide whether or not to authorize the transaction. The chip type data is received by the issuer and can be used to authenticate the portable device that was used to conduct the transaction.

Before discussing specific embodiments of the invention, some descriptions of some specific terms are provided below.

An "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. An authorization request message may comprise data elements including, in addition to the account identifier, a service code, a CVV (card verification value), and an expiration date.

An "authorization response message" may be an issuing financial institution's electronic message reply to an authorization request, which may include one or more of the following status indicators: Approval—transaction was approved; Decline—transaction was not approved; or Call Center—response pending more information, merchant must call the toll-free authorization phone number. It may also include an authorization code, which may be a code that a credit card issuing bank returns in an electronic message to the merchant's POS equipment that indicates approval of the transaction. The code serves as proof of authorization.

A "chip type" portable device can be embedded with an integrated circuit, or chip, that communicates information to a point of transaction terminal. Chip type portable devices can include chip cards offer increased functionality (and security) through the combination of significant computing power and substantial data storage. Further, a chip type portable device can include a transaction-unique digital seal or signature in the chip that proves its authenticity in an offline environment and prevents criminals from using fraudulent payment cards. It can be used to secure online payment transactions and protect cardholders, merchants and issuers against fraud through a transaction-unique online cryptogram. It may also be used to support enhanced user verification methods.

A chip type portable device may store data elements including a cryptogram, variable data elements such as counters, and other information. Counters, in particular, can be used to calculate verification values such as CVV, CVV2, dCVV, and dCVV2 verification values. For example, a portable device may include a counter and may generate a first verification value using the counter when each transaction is conducted by the portable device. Thus, the counter can keep track of the number of transactions that are conducted by the portable device, and can cause the first verification value to change with each transaction. During a transaction, the first verification value can be passed to a central server computer, which may also maintain a second corresponding counter. The central server computer may independently generate a second verification value and may then compare it to the first verification value. If they match, or are within a predetermined range, then the transaction may be considered to be authentic. If the first and second verification values are very different, then this may indicate that the portable device that is being used to conduct the transaction is not authentic. Dynamic counters such as these are not stored on magnetic stripes on conventional payment cards, because conventional payment cards do not have the ability to manipulate data.

A "cryptogram" can refer to a numeric value that is the result of data elements entered into an algorithm and then encrypted, commonly used to validate data integrity. Cryptograms can include an Authorization Request Cryptogram (ARQC), an Authorization Response Cryptogram (ARPC), a Transaction Certificate (TC), and an Application Authorization Cryptogram (AAC).

A "chip type format" may include a data format that is compatible with carrying data from a chip type portable device. The data format may be part of a message (e.g., an authorization request message or an authorization response message). A chip type format may include chip-based data elements such as cryptograms and variable data elements such as counters. They may also include an account number, expiration date, and service code.

A "first format" may include a magnetic stripe format, or any other suitable data format, that is different than the chip type format. For example, the "first format" may include a non-chip type format such as a magnetic stripe format that may comply with ISO standard 8583, and that may carry data elements including an account number, expiration date, and service code.

A "communications channel" may include any suitable path for communication between two or more entities. Suitable communications channels may be present directly between two entities such as a client computer and a gateway server, or may include a number of different entities. Any suitable communications protocols may be used for communications channels according to embodiments of the invention.

"Account information" may include any suitable information associated with an account. Such information may be directly related to the account or may be derived from information related to the account. Examples of account information include a PAN (primary account number), name, expiration date, CVV (card verification value), dCVV (dynamic card verification value), CVV2 (card verification value 2), and dCVV2 (dynamic card verification value 2). CVV2 is generally understood to be a static verification value associated with a portable payment device. dCVV2 is a dynamic verification value associated with a portable payment device. dCVV2 and CVV2 values are generally visible to a user (e.g., a consumer), whereas CVV and dCVV values are typically embedded in memory or the authorization request message and are not readily known to the user (although they are known to the issuer and payment processors).

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

Specific details regarding some of the above-described aspects are provided below. The specific details of the specific aspects may be combined in any suitable manner without departing from the spirit and scope of embodiments of the invention.

I. Exemplary Systems

A system according to an embodiment of the invention is shown in FIG. 1. FIG. 1 shows a system 20 that can be used in an embodiment of the invention.

The system 20 may include a plurality of merchants, access devices, portable devices, acquirers, and issuers. For example, the system 20 may include a merchant computer 72 associated with merchant, an acquirer computer 22 associated with an acquirer, and an issuer computer 28 associated with an issuer. A payment processing network 24 may be between the acquirer computer 22 and the issuer computer 28. Further, the merchant computer 72, the acquirer computer 22, the payment processing network 24, and the issuer computer 28 may all be in operative communication with each other.

A client computer 36 may communicate with the merchant 22 via a communications network such as the Internet 62. A verification token 34 may be associated with the client computer 36 that is used by a user 30. It may allow the client computer 36 to form a first secure communications channel 38 (an example of a first channel) to an Internet Protocol Gateway (IPG) 27, which may be in operative communication with the payment processing network 24. Although the IPG 27 is shown as being a separate entity in FIG. 1, the IPG 27 could be incorporated into the payment processing network 24, or could be omitted. In the latter situation, the first secure communications channel 38 could directly connect the payment processing network 24 and the client computer 36.

The client computer 36 may be in any suitable form. Examples of client computers may include phones, televisions, personal computers, laptop computers, PDAs, set top boxes, cars, and other computing devices. In some embodiments, the client computer may comprise a processor, and a computer readable medium coupled to the processor. The computer readable medium comprises code, executable by the processor, for implementing a method comprising: receiving account information from a portable device, wherein the portable device comprises a chip storing the account information; establishing a secure communications channel with a remote server computer; and forwarding the account information associated with an account to the server computer, wherein the server computer thereafter receives a first authorization request message from a merchant for a transaction, and then sends a second authorization request message for the transaction to the issuer in a chip type data format.

The payment processing network 24 may reside between the acquirer computer 22 and an issuer computer 28. The path which includes the merchant computer 72, the acquirer computer 22, and the payment processing network 24, may form at least part of a second communications channel 39.

As used herein, an "issuer" is typically a business entity (e.g., a bank) which maintains financial accounts for the consumer and often issues a portable device such as a credit or debit card to the consumer. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

The portable device 32 may be in any suitable form. In some embodiments, the consumer devices are portable in nature and may be portable devices. Suitable portable devices can be hand-held and compact so that they can fit into a consumer's wallet and/or pocket (e.g., pocket-sized). They may include smart cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card).

The payment processing network 24 may include data processing subsystems, networks, and operations used to support and deliver authorization services, exception file services, and clearing and settlement services. For example, the payment processing network 24 may comprise a server computer, coupled to a network interface, and a database of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 24 may use any suitable wired or wireless network, including the Internet.

In some embodiments, the server computer may comprise a processor, and a computer readable medium coupled to the processor. The computer readable medium includes code executable by the processor for implementing a method comprising: receiving a first authorization request from a merchant through a communication channel, wherein the first authorization request message is in a first format; creating a second authorization request message corresponding to the first authorization request message, wherein the second authorization request message is in a chip type format; and forwarding the second authorization request message to an issuer for approval.

Although many of the data processing functions and features of specific embodiments of the invention are present in the payment processing server computer 29 (described in detail below), it is understood that such functions and features could alternatively be present in the issuer computer 28, and need not be present in the payment processing network server computer 29.

Figure 2:
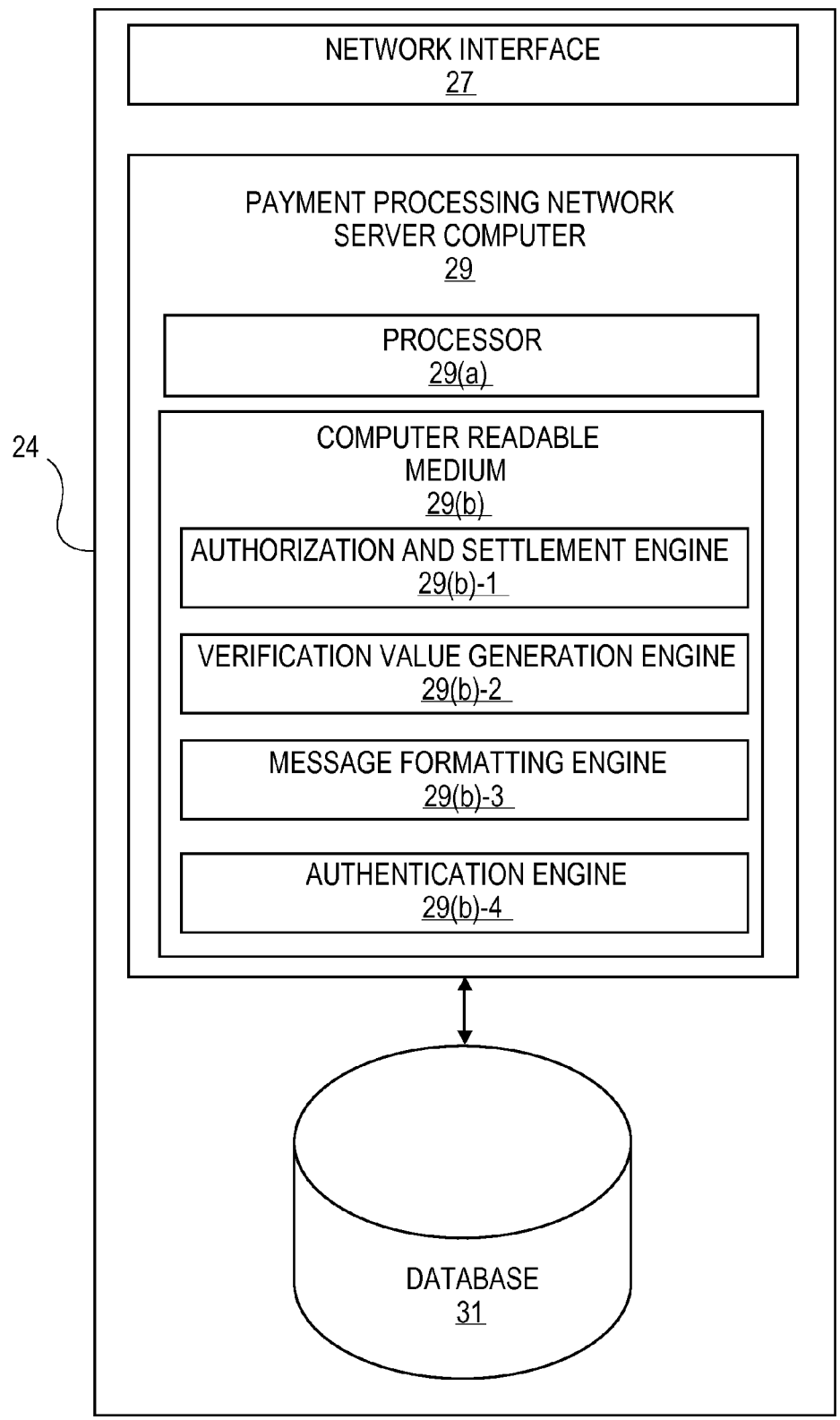
FIG. 2 shows a block diagram of some components of a payment processing network according to an embodiment of the invention.

FIG. 2 shows a block diagram of some components of the payment processing network 24. It may include a network interface 27, as well as a payment processing network server computer 29. The server computer 29 may comprise a processor 29(a), and a computer readable medium 29(b) coupled to the processor.

The computer readable medium 29(b) may also include a number of software engines including an authorization and settlement engine 29(b)-1, a verification value generation engine 29(b)-2, a message formatting engine 29(b)-3, and an authentication engine 29(b)-4.

The authorization and settlement engine 29(b)-1 may include code for performing authorization and settlement processing for a plurality of issuers and acquirers. It may also analyze authorization response and request messages and route them to the intended recipients. It may further provide for clearing and settlement functions between various acquirers and issuers.

The verification value generation engine 29(b)-2 may include code for generating verification values such as dynamic verification values such as dCVV and dCVV2 values. Such dynamic verification values may be 3, 4, 5 or more characters in length. They may be further created using any suitable data conversion process.

The authentication engine 29(b)-4 may comprise code for authenticating the user, or the portable device that is being used by the user to conduct a payment transaction. It may further include a suitable risk module, which can be used to create risk scores for the transactions being processed. Such scores may be placed in authorization request messages so that issuers can make authentication determinations.

II. Exemplary Methods

Figure 3A:
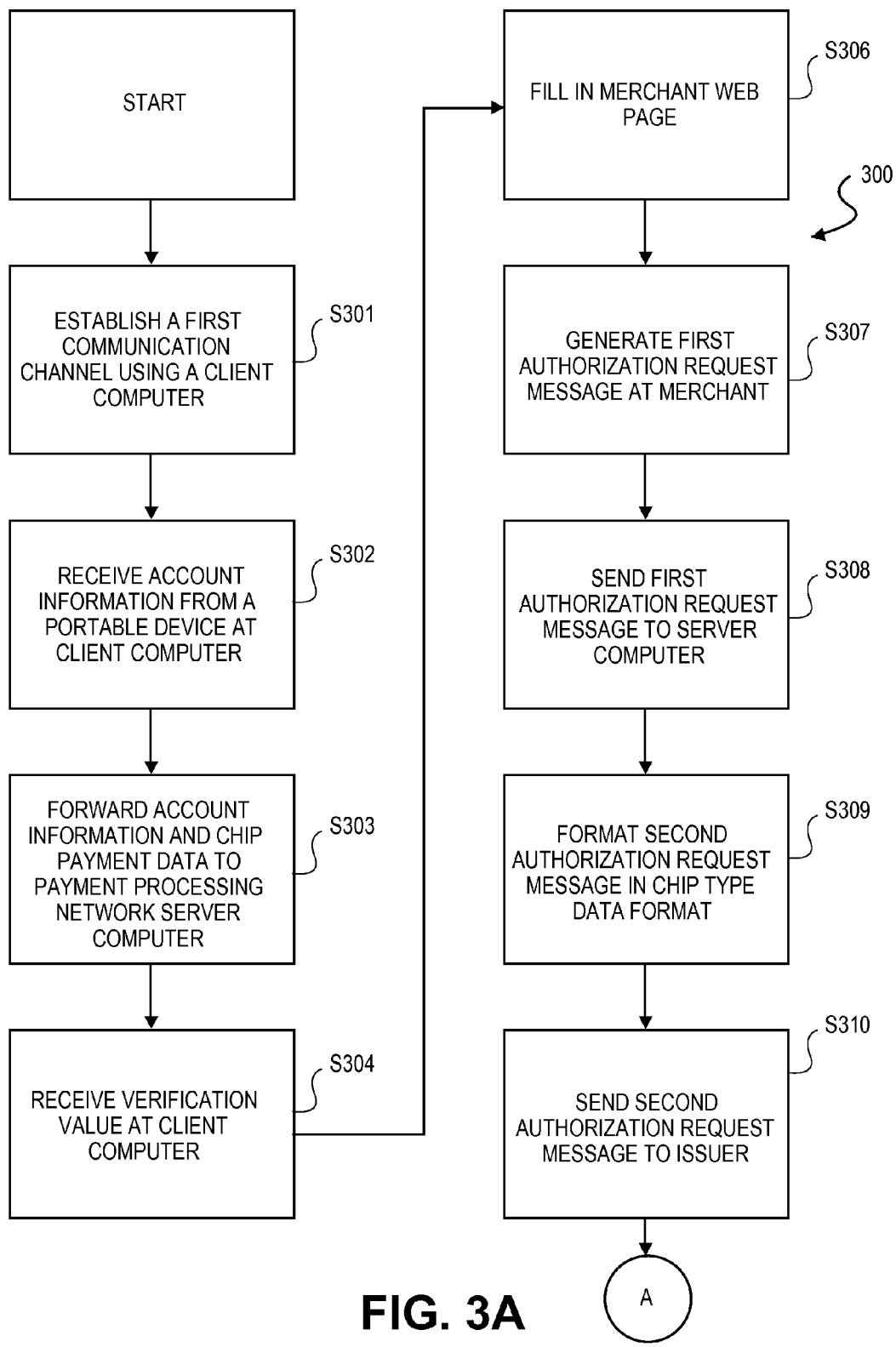
FIGS. 3(a) and 3(b) show flowcharts illustrating methods according to embodiments of the invention.
Figure 3B:
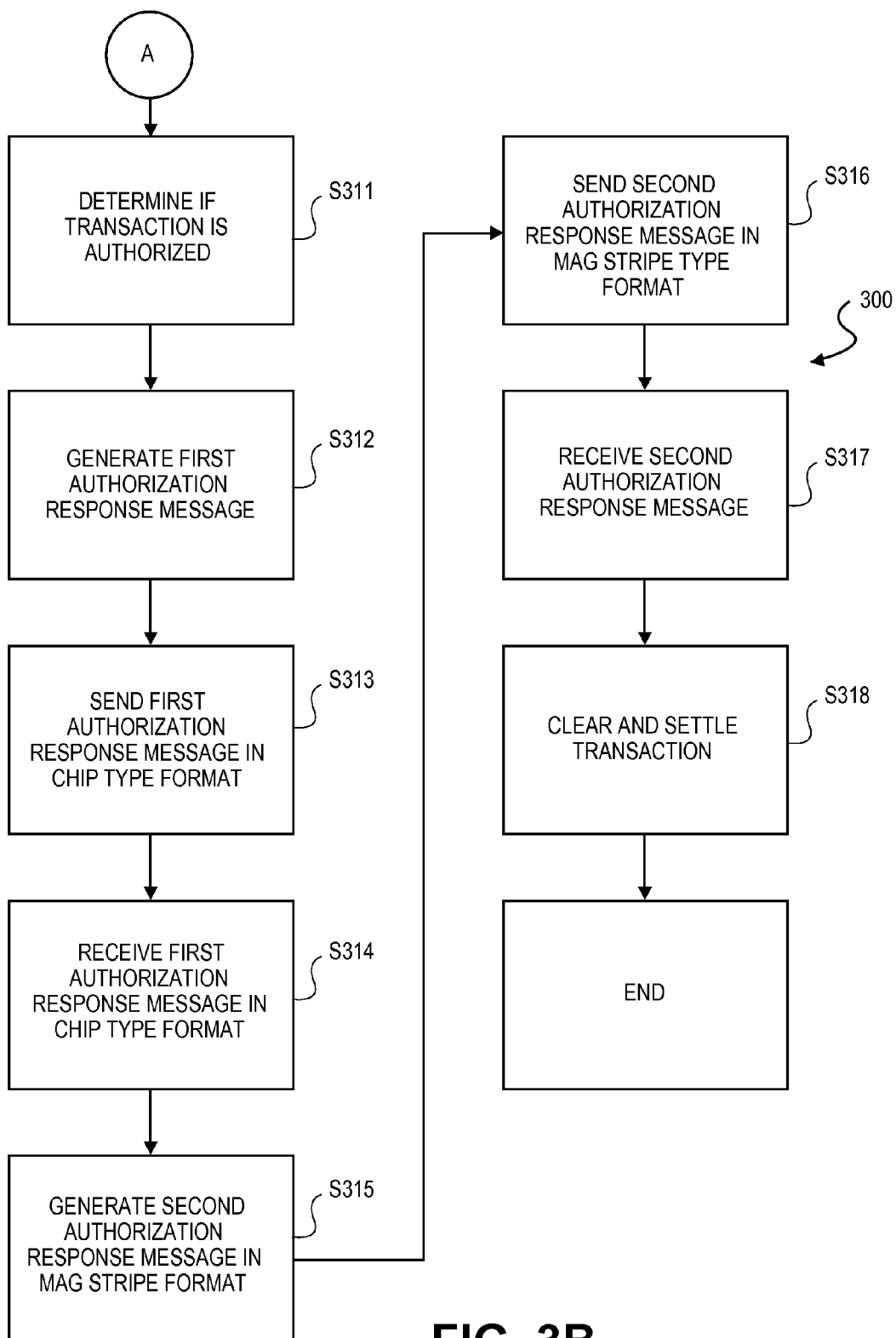
Figure 4:
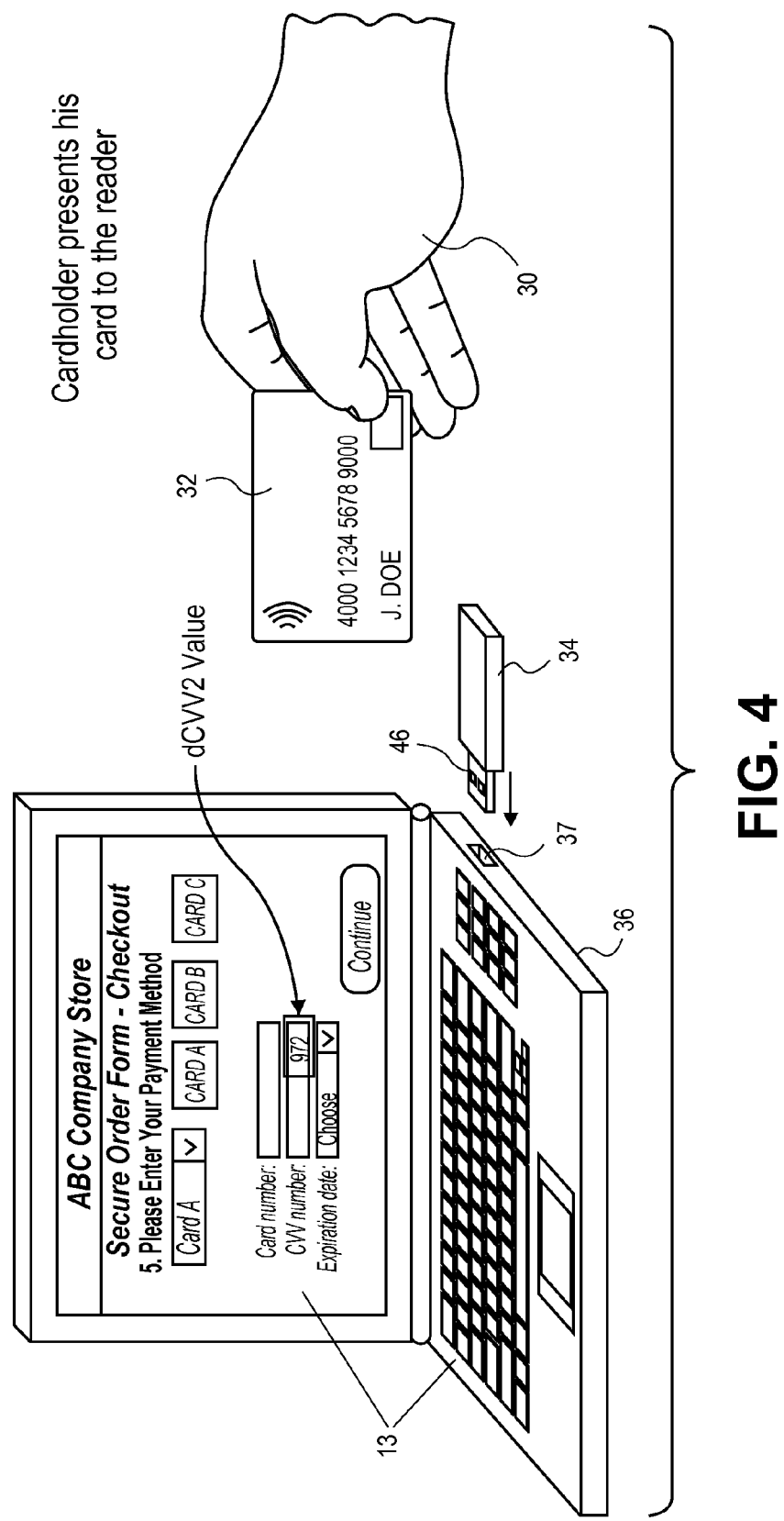
FIG. 4 shows a picture of a person interacting with a verification token that is associated with a client computer.
Figure 5:
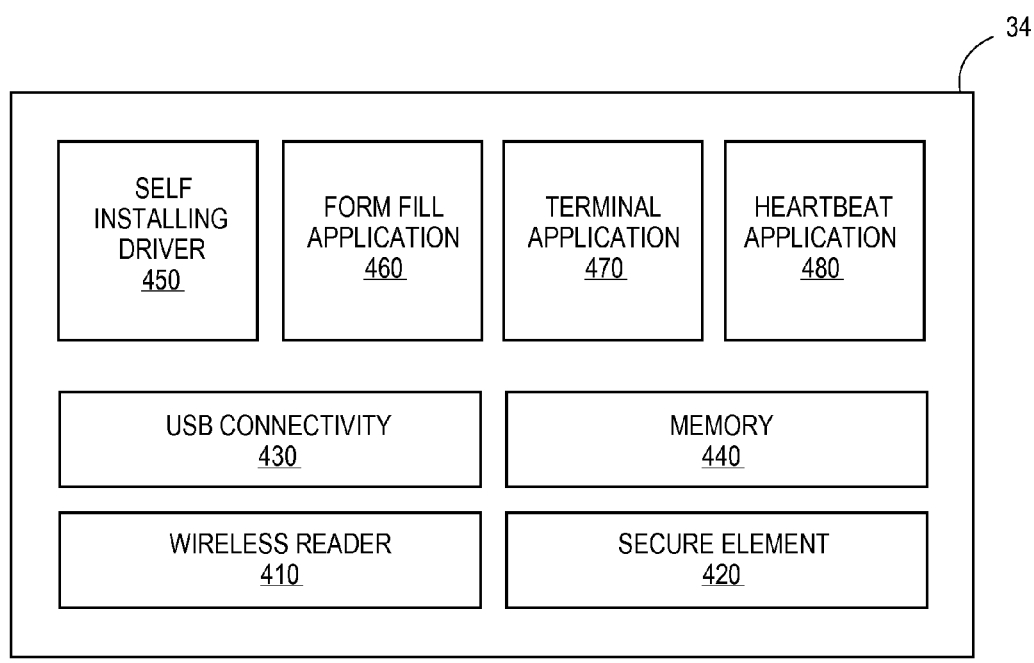
FIG. 5 shows a block diagram of some components of a verification token according to an embodiment of the invention.

Methods according to embodiments of the invention are described FIGS. 3-4 with reference to the system elements in FIG. 1-2, as well as FIG. 5.

Referring to FIGS. 1 and 4, prior to establishing the first communications channel 38, in embodiments of the invention, a user 30 may receive a verification token 34 such from his or her financial institution. Alternatively, the user 30 may receive the verification token 34 from another entity on behalf of a financial institution.

The user 30 can then connect the verification token 32 into the USB port 37 of his client computer 36 via a connector 46. The client computer 36 can power the verification token 32. Once it is connected to the client computer 36, it can recognize the presence of the verification token 34 as a valid device, and the verification token 34 can self-install. The verification token 34 can then check with the client computer 36 to check for Internet connectivity. Note that although the client computer 36 and the verification token 34 are shown as separate devices in FIG. 4, in other embodiments, the verification token 34 may be part of the client computer 36.

If Internet connectivity is available, the verification token 34 can then automatically attempt to establish a background SSL session to the IPG 27 so that it can be used as a part of an authentication process.

FIG. 5 shows some components that can be present in the verification token 32. It may include an application, such as the self-installing driver 450, so that the verification token 34 may install itself automatically after the verification token 34 is inserted into and recognized by the client computer 36. The token application is then able to connect to a backend host, perhaps at a predefined IP address, using a background secure SSL browser session. A terminal application 470 and heartbeat application 480 may be used to establish and maintain this browser session. If the session connection is successfully established, the token identifies itself to the IPG 27 by providing its unique serial number and IP address to the IPG 27. Other information may also be passed (e.g., password) to the IPG 27 at this point.

The embodiment of the verification token 34 illustrated in FIG. 5 is a USB token that includes a USB connectivity module 430, a secure element 420 (e.g., a chip such as a smart card chip, which has sufficient data and security protocols and hardware), a wireless/contactless reader 410 capable of reading payment data from a portable device, built in memory 440, a self-installing driver 450, a form fill application 460, a terminal application 470, and a heartbeat application 480. The verification token 34 may also have other features such as a keyboard buffer capability and a unique serial number associated with the verification token 34. The verification token 34 can have little or no footprint on the client computer 36 when it is plugged into a standard client computer with Internet connectivity.

Although FIG. 5 illustrates a token as something similar to a USB stick, the token may come in other forms. For example, it may be piece of hardware or other module installed into a computer, consumer device, or other device.

Referring now to FIG. 3(a), at step S301, the user 30, using the client computer 36, establishes a first communication channel 38 to a gateway server computer, such as an Internet Protocol Gateway (IPG) 27. The IPG 27 can be in communication with a payment processing network 24. Note that in the description below, the gateway server computer and the payment processing network server 29 could be embodied by a single or separate computer apparatuses. Such computer apparatuses may function separately or together to facilitate the functions described herein.

At step S302, after establishing the first communication channel 38 from the client computer 36 to the IPG 27 and the payment processing network 24, the user 30 manipulates the portable device 32 so that it interacts with the client computer 36. For example, the user 30 may be asked to present the portable device 32 to compete transaction while shopping. As described earlier, after the verification token 34 is placed into the client computer 36, and upon successful mutual authentication, the IPG 27 may register the verification token 34 and its IP address for a session. A session key is associated with the session.

At some point during the process, the IPG 27 can validate a token serial number associated with the verification token 34 and credentials from information accessible in a remote or local database. If valid, the IPG 27 may calculate a UDK (unique derived key) for the token based on a master key and the serial number. A unique derived key (UDK) can be stored in the token secure element 420. This host-token mutual authentication may use a Triple DES based algorithm.

The token-IPG 27 mutual authentication can then take place. Upon successful mutual authentication, the IPG 27 can then register the token 34 and its IP address for this session. A session key is established upon mutual authentication to support all the communication for that session between the verification token 34 and the host. All the data exchanged between the token and the backend host can be encrypted and tunneled through an SSL session. The session could stay alive or be terminated or restarted at any time. At this point, the IPG 27 is aware of the token, serial number, session key, and IP address. In some embodiments, a dCVV2 (dynamic verification value) may be sent to the token at this time. In some embodiments, a dCVV2 will be sent only after it is requested by the verification token 34, as described in further detail below.

After the session is established, as shown in FIG. 4, the portable device 32 can be a payment device, such as a credit card, and can be used to interact with a verification token (e.g., a USB dongle) that is associated with the client computer 36. The portable device 32 can comprise a chip comprising chip card type data such as a dynamic counter, dynamic verification value, personal account number (PAN), cryptogram, user information, expiration date, card number, issuer information, etc.

In embodiments of the invention, the chip on the portable device 32 can interact with the verification token 34 through a contact interface and/or a wireless near field communication (NFC) (e.g., contactless) interface. Accordingly, as noted above, the verification token 34 can include a reader having a contact and/or contactless capabilities. During the interaction between the verification token 34 and the portable device 32, the verification token 34 can receive the chip type formatted data from the portable device 32 and communicate the data to the client computer 201, and then to the IPG 27 and the payment processing network 24. The verification token 34 can further allow the client computer 201 to establish the secure the first communications channel 38 with the IPG 27, by using cryptograms generated each time the portable device 32 interacts with the verification token 34.

The user 30 may then initiate a request to receive a new dCVV2 value by presenting the consumer device to the reader. The cardholder may do this by waving a portable device near a wireless or contactless reader in the verification token 34. Alternatively, some embodiments may utilize readers than can read the magnetic stripe that may be present on a portable device.

The verification token 34 powers the portable device 32 to collect account information such as one or more account numbers, crytograms, CVV and CVV2 values for a transaction. Other data that may be collected from the same or another source may include a session key with IP Gateway. The verification token 34 may then encrypt this collected data.

At step S303, the client computer 36 forwards the account information and other information to the Internet Protocol Gateway 27 through the first communication channel 38, preferably in encrypted form. The IPG 27 then forwards the account information to the payment processing server computer 29 in the payment processing network 24, where the data is stored in a database 31, and where a verification value (e.g., a dCVV2) is generated and is associated with the data.

The IPG 27 then validates the received information. For example, the IPG 27 may receive a dCVV2 request from the verification token 34 including the encrypted PAN and additional information (encrypted using the session key). The IPG 27 can identify the PAN associated with this request and validate the PAN and token relationship. If the information is validated, the IP Gateway can generate a dCVV2 value.

Next, at step S304, a verification value is sent from the IPG 27 through the secure first communication channel 38 to the client computer 36. In some embodiments, the verification value can include a digital card verification value (dCVV2). However, the verification value can by any value associated with the portable device that can be utilized to identify and verify that portable device during a transaction. The client computer 36 can store the verification value or complete an auto-fill of the merchant 72 check out page when the value is received. In other embodiments, the verification value can be received and displayed on the client computer 36 for the user. This is also illustrated in FIG. 4.

Thus, at step S306, the verification token 34 may enter a dCVV2 value on a merchant website operated by the merchant computer 72. The verification token 34 may use a form fill application 460 to form fill the PAN and the dCVV2 value. Other information may also be filled out by the token, such as shipping addresses, according to various embodiments. The user then conducts a transaction with a merchant using the dCVV2 and other payment data.

Once at the checkout page, the user can either manually enter the information required to complete the transaction or, optionally, an auto-complete feature can be included in the verification token 34. In the latter embodiment, the verification token 34 can include a software module that includes instructions (e.g., computer code) executable by a processor for communicating the portable device data when the checkout page is presented to the user 30. This information can include the user's personal information including a payment card number, expiration date, billing information, name, and the verification value (e.g., dCVV2) that was obtained through the first channel of communication from the payment processing network 206 and the IPG 27. When the portable device data is entered into the checkout page and is confirmed (e.g., through a 'submit' or similar type button), the data is forwarded to the merchant 72 through the first communication channel 39, which can be securely established through a medium such as the Internet.

At step S307, a first authorization request message is generated by the merchant computer 72. The first authorization request message may be formatted in a legacy format such as a magnetic stripe data format. It may include only those data elements associated with a magnetic stripe transaction.

At step S308, the verification value and legacy type formatted portable device data is sent to the payment processing network 24 by the merchant 72 to complete a transaction. In this step, the data is communicated to the merchant 72 through a second communications channel 38, which also includes the payment processing network 24. The second communications channel 209 can include a communication path between entities including the merchant computer 72, the acquirer computer 22, a payment processing network 24 and an issuer computer 28.

The payment processing network 24 then receives the first authorization request message generated by the merchant computer 72, preferably through the acquirer computer 22. The first authorization request message can be in magnetic stripe format, which can also be referred to as a legacy type formatted transaction. The data in the first authorization request message can include a card verification value (CVV), a payment account number (PAN), a bank identification number (BIN), merchant category code (MCC), the transaction amount and related details, the verification value (dCVV2) previously generated by the payment processing network 24, etc.

After the payment processing network 24 receives the first authorization request message, the payment processing network 24 can then use the dCVV2 associated with the PAN to help authenticate a transaction involving the PAN. The payment processing network 24 can compare the dCVV2 received from the merchant computer 72 with the dCVV2 received from the IPG 27 to see if they match. In this way, the dCVV2 can be used to help authenticate the portable device 32 conducting the transaction.

In step S309, once the first authorization request message is received by the payment processing network 24, the payment processing network server computer 29 can use the verification value, or other account information, to retrieve the associated chip type formatted data associated with the portable device and form a second authorization request message. The payment processing network 24 can access the chip type formatted data from a data storage coupled to the payment processing network server computer 29, such as the database 31, where the data was previously stored after being received through the first communications channel 38.

In step S310, the payment processing network server computer 29 can then send the second authorization request message to the issuer computer 28. The second authorization request message may include chip type data including account information from a chip type portable device, and may be in a chip type format.

In step S311, after the issuer computer 28 receives the authorization request message, the issuer computer 28 determines whether or not the transaction is authorized. The issuer computer 28 may determine that the transaction is not authorized for a number of reasons. For example, there may be insufficient funds or value in the account associated with the portable device, or the authorization request message may comprise a risk score indicating that the transaction is somewhat risky.

In step S312, the issuer computer 28 then generates an authorization response message, preferably in a chip type format. Alternatively, the authorization response message may be present in a conventional data format such as a magnetic stripe data format.

In step S313, the issuer computer 28 then sends the authorization response message to the payment processing network 24.

In step S314, the first authorization response message is received in a chip type format at the payment processing network 24.

In step S315, the payment processing network server computer 29 can use the message formatting engine 29(b)-3 to format a second authorization response, where the second authorization response message is in the first format. The first format may be a magnetic stripe data format.

In step S316, the payment processing network server computer 29 can then send the second authorization response message to the merchant computer 72 via the acquirer computer 22.

In step S317, the merchant computer 72 receives the second authorization response message, and the response may be shown or otherwise communicated to the user 30.

At step 318, at the end of the day or at some other suitable time, a clearing and settlement process occurs between the various issuers and acquirers coupled to the payment processing network 24.

Embodiments of the invention have a number of advantages. For example, the generation of the second authorization request message by the payment processing server allows for merchants to maintain present transaction systems and without requiring a major portion of the payments infrastructure to change. Also, the aforementioned embodiments provide a consumer with a more secure payment to a merchant as chip type formatted transactions are generally regarded as being more secure than legacy type transactions. This is because a chip type formatted transaction can include more information (e.g., verification and security data) than a legacy formatted transaction, which allows for additional validation information to be included in the authorization request.

Embodiments of the invention are not limited to the above-described embodiments. For example, although separate functional blocks are shown for an issuer computer, payment processing network, and acquirer computer, some entities perform all of these functions and may be included in embodiments of invention. Further, although the methods described show stages or steps in a particular order, embodiments of the invention may include some all or none of the recited steps in any combination without departing from the scope of the invention.

Though the above methods are described using the exemplary situation of a user conducting an online transaction from a home computer, embodiments of these methods are also applicable to other transactional situations. For example, a user may enter a merchant location and the merchant may only employ a magnetic stripe reader and/or provide legacy type transactions. The user may wish to perform a chip type transaction. The chip type format information of a payment device can be securely stored on his or her portable device (e.g., a mobile phone) or previously stored on the payment processing network. The user can establish a first channel of communication through the mobile phone to the payment processing network and can receive a verification value that is returned and displayed on the mobile phone. When the user provides the card number, expiration, etc. to a merchant only employing a legacy type formatted reader and transaction, the user can additionally provide the verification value to the merchant for manual entry. When the merchant sends the authorization request, the transaction is processed in a similar method as described above.

In yet another embodiment, a user may decide that an online or in person transaction will be conducted at a later point in time. In such an embodiment, the user can log into a system, such as one provided through a merchant, issuer or payment processing network, and select a merchant and/or location in which a future magnetic stripe type transaction will occur. The user can then interface his or her portable device with a verification token on a home computing device. In an embodiment where the portable device is an IC chip card, the verification value generated on the IPG can be returned to and made viewable by computing device. The user can note the verification value and supply it to a merchant that conducts a magnetic stripe transaction. In the embodiment where the user's portable device is a mobile phone, the verification value can be returned (e.g., written to) the mobile phone and stored on the mobile phone. The user can then view the verification value and provide it to the merchant where a magnetic stripe transaction is being conducted. In a further embodiment, the verification value can be used for multiple magnetic stripe transactions conducted at a time after the value is generated.

III. Exemplary Portable Devices and Computer Apparatuses

Figure 6A:
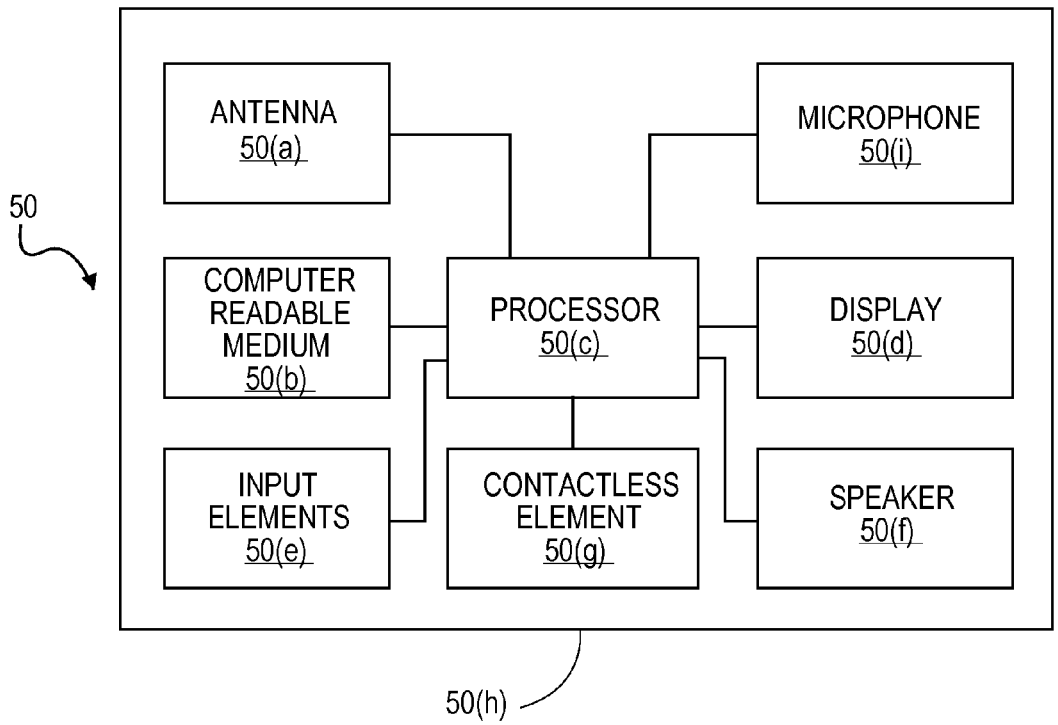
FIG. 6(a) shows a block diagram of functional components present in a mobile phone.
Figure 6B:
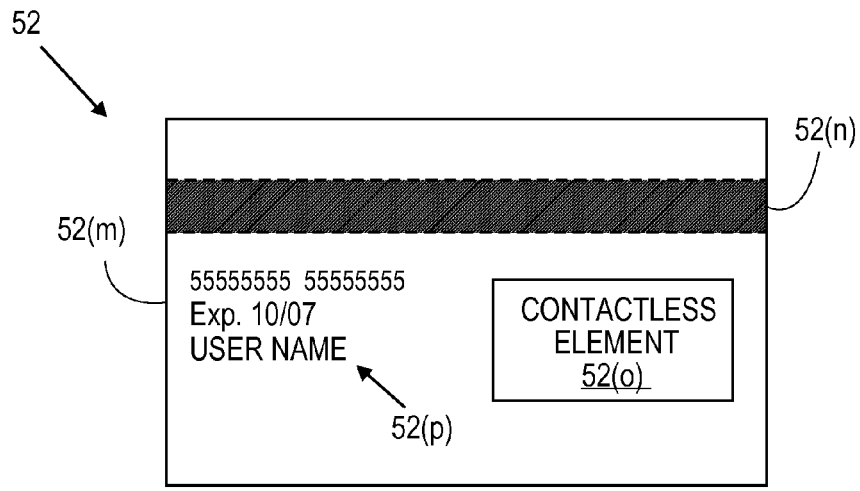
FIG. 6(b) shows a schematic depiction of a payment card.
Figure 7:
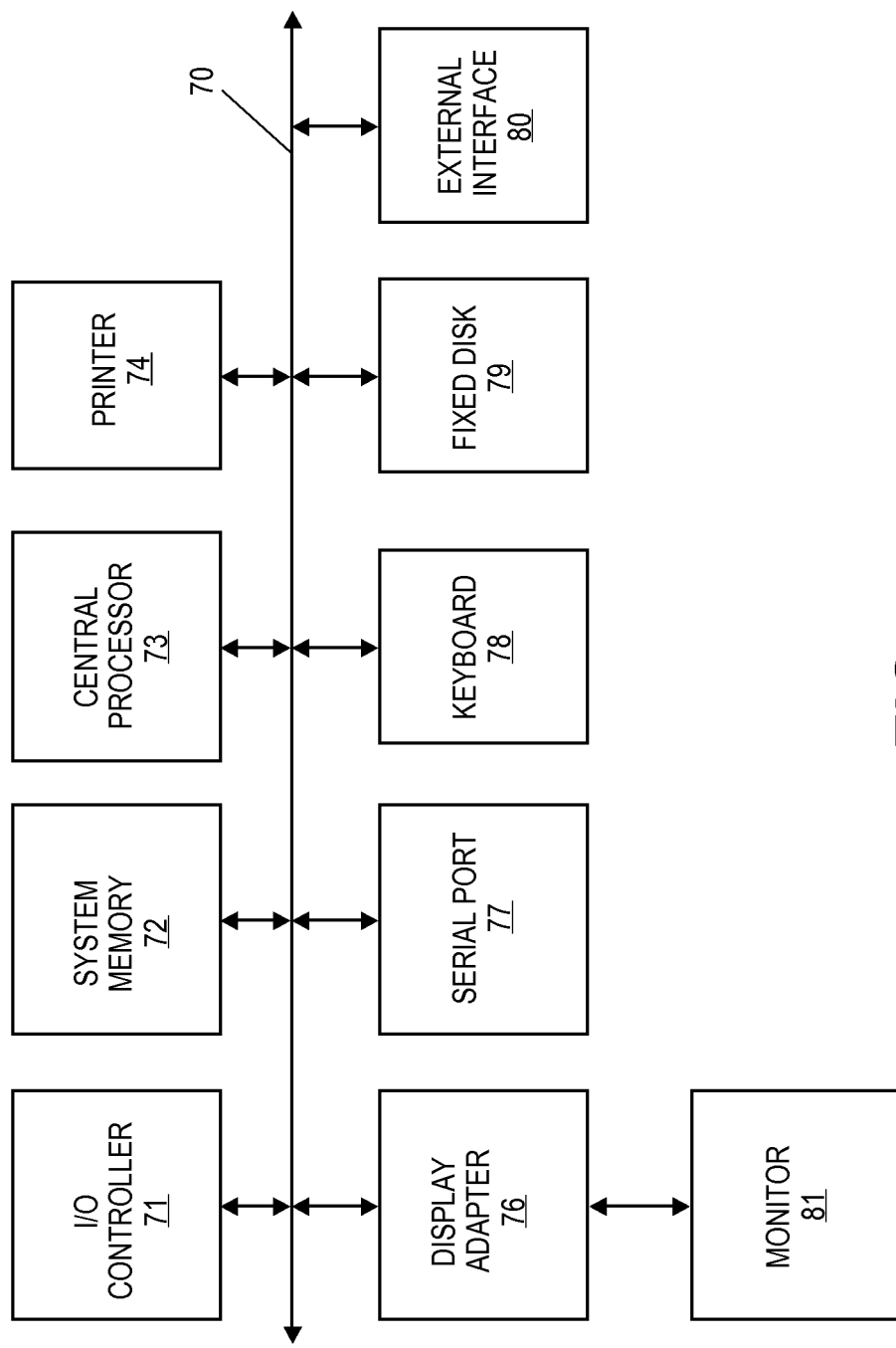
FIG. 7 shows a block diagram of a computer apparatus.

Exemplary devices used in the aforementioned systems and methods are described with reference to FIGS. 6(a) and 6(b), and 7. In particular, FIGS. 6(a) and 6(b) provide illustrative examples of portable devices in the form of a mobile phone and a card, respectively. FIG. 7 provides an illustrative example of the computing apparatus, which may be utilized in the exchange and processing of data during a transaction.

Referring now to FIG. 6(a), a block diagram of a phone 50 that can be used in embodiments of the invention is provided. The phone can be both a notification device that can receive alert messages, as well as a portable device that can be used to make payments. The exemplary wireless phone 50 may comprise a computer readable medium and a body as shown in FIG. 5(a). The computer readable medium 50(b) may be present within the body 50(h), or may be detachable from it. The body 50(h) may be in the form a plastic substrate, housing, or other structure. The computer readable medium 50(b) may be in the form of (or may be included in) a memory that stores data (e.g., issuer account numbers, loyalty provider account numbers, etc.) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, loyalty account information (e.g., a loyalty account number), a bank identification number (BIN), credit or debit card number information, account balance information, expiration date, consumer information such as name, date of birth, etc. Any of the aforementioned information may be transmitted by the phone 50.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. Track 1 is sometimes used by the airlines when securing reservations with a credit card. Track 2 ("American Banking Association") is currently and most commonly used. Track 2 is the track that is read by ATMs and credit card checkers. The ABA (American Banking Association) designed the specifications of Track 2 and all world banks abide by those specifications. Track 2 contains the cardholder's account, encrypted PIN, and other discretionary data.

The phone 50 may further include a contactless element 50(g), which is typically implemented in the form of a semiconductor chip (or other data storage element) with an associated wireless transfer (e.g., data transmission) element, such as an antenna. Contactless element 50(g) is associated with (e.g., embedded within) phone 50 and data or control instructions transmitted via a cellular network may be applied to contactless element 50(g) by means of a contactless element interface (not shown). The contactless element interface functions to permit the exchange of data and/or control instructions between the mobile device circuitry (and hence the cellular network) and an optional contactless element 50(g).

Contactless element 50(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 50 and an interrogation device. Thus, the phone 50 is capable of communicating and transferring data and/or control instructions via both cellular network and near field communications capability.

The phone 50 can also include a processor 50(c) (e.g., a microprocessor) for processing the functions of the phone 50 and a display 50(d) to allow a consumer to see phone numbers and other information and messages. The phone 50 can further include input elements 50(e) to allow a user to input information into the device, a speaker 50(f) to allow the user to hear voice communication, music, etc., and a microphone 50(i) to allow the user to transmit her voice through the phone 50. The phone 50 may also include an antenna 50(a) for wireless data transfer (e.g., data transmission).

If the portable device is in the form of a debit, credit, or smartcard, the portable device may also optionally have features such as magnetic strips. Such devices can operate in either a contact or contactless mode.

Another example of a portable device in the form of a card 52 is shown in FIG. 6(b). FIG. 6(b) shows a plastic substrate 52(m). A contactless element 52(o) for interfacing with an access device can be present on or embedded within the plastic substrate 52(m). Consumer information 52(p) such as an account number, expiration date, and user name may be printed or embossed on the card. Also, a magnetic stripe 52(n) may also be on the plastic substrate 52(m). The card 52 may also comprise a microprocessor and/or memory chips with user data stored in them, such as an integrated circuit (IC) chip.

The various participants and elements (e.g., the issuer, the directory server, payment processing network, the IP Gateway, the merchant, the acquirer, and the user computer) in FIGS. 1 and 2, can operate one or more computer apparatuses (e.g., a server computer) to facilitate the functions described herein. Any of the elements in FIGS. 1 and 2 can use any suitable number of subsystems to facilitate the functions described in the systems and methods described in previous sections. Examples of such subsystems or components are shown in FIG. 7. The subsystems shown in FIG. 7 are interconnected via a system bus 70. Additional subsystems such as a printer 74, keyboard 78, fixed disk 79 (or other memory comprising computer readable media), monitor 81, which is coupled to display adapter 66, and others are shown. Peripherals and input/output (I/O) devices, which coupled to I/O controller 71, can be connected to the computer system by any number of means known in the art, such as serial port 77. For example, serial port 77 or external interface 80 can be used to connect the computer apparatus to a wide area network such as the Internet, a mouse input device, or a scanner. The interconnection via system bus allows the central processor 73 to communicate with each subsystem and to control the execution of instructions from system memory 72 or the fixed disk 79, as well as the exchange of information between subsystems. The system memory 72 and/or the fixed disk 79 can embody a computer readable medium.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at a server computer, a first authorization request from a merchant through a communications channel, wherein the first authorization request message includes an identifier of a financial account associated with an issuer, and wherein the first authorization request message is in a first format;
   creating, by the server computer, a second authorization request message corresponding to the first authorization request message, wherein the second authorization request message is in a second format that is more secure than the first format, and wherein creating the second authorization request message comprises adding a data element to the first authorization request message; and
   forwarding, by the server computer, the second authorization request message to the issuer for approval.

2. The method of claim 1, wherein the communications channel is a second communications channel, and wherein the method further comprises receiving, at the server computer, account information through a first communications channel between the server computer and a client computer.

3. The method of claim 2, wherein the data element is determined based upon the received account information.

4. The method of claim 2, wherein a verification token associated with the client computer previously interacted with a portable device, and wherein the method further comprises:
   generating, by the server computer, a verification value associated with the received account information; and
   forwarding, by the server computer, the verification value to the client computer through the first communications channel.

5. The method of claim 4, wherein the portable device is associated with the issuer, and wherein the first authorization request message includes the verification value.

6. The method of claim 5, wherein determining the data element based upon the received account information comprises identifying, by the server computer, the account information using the verification value.

7. The method of claim 1 further comprising:
   receiving, at the server computer, a first authorization response message from the issuer, wherein the first authorization response message is in the second format that is more secure than the first format;
   creating, by the server computer, a second authorization response message corresponding to the first authorization response message, wherein the second authorization response message is in the first format, and wherein creating the second authorization response message comprises removing the data element from the first authorization response message; and
   forwarding, by the server computer, the second authorization response message to the merchant through the communications channel.

8. A server computer comprising:
   a processor; and
   a computer readable medium coupled to the processor, wherein the computer readable medium includes code executable by the processor for implementing a method comprising:
      receiving a first authorization request from a merchant through a communications channel, wherein the first authorization request message includes an identifier of a financial account associated with an issuer, and wherein the first authorization request message is in a first format;
      creating a second authorization request message corresponding to the first authorization request message, wherein the second authorization request message is in a second format that is more secure than the first format, and wherein creating the second authorization request message comprises adding a data element to the first authorization request message; and
      forwarding the second authorization request message to the issuer for approval.

9. The server computer of claim 8, wherein the communications channel is a second communications channel, and wherein the method further comprises receiving account information through a first communications channel between the server computer and a client computer.

10. The server computer of claim 9, wherein the data element is determined based upon the received account information.

11. The server computer of claim 9, wherein a verification token associated with the client computer previously interacted with a portable device, and wherein the method further comprises:
   generating a verification value associated with the received account information; and
   forwarding the verification value to the client computer through the first communications channel.

12. The server computer of claim 11, wherein the portable device is associated with the issuer, and wherein the first authorization request message includes the verification value.

13. The server computer of claim 12, wherein determining the data element based upon the received account information comprises identifying the account information using the verification value.

14. The server computer of claim 8 further comprising:
   receiving a first authorization response message from the issuer, wherein the first authorization response message is in the second format that is more secure than the first format;
   creating a second authorization response message corresponding to the first authorization response message, wherein the second authorization response message is in the first format, and wherein creating the second authorization response message comprises removing the data element from the first authorization response message; and
   forwarding the second authorization response message to the merchant through the communications channel.

15. A method comprising:
   receiving, at a client computer, account information from a data storage of a portable device;
   establishing, by the client computer, a secure communications channel with a remote server computer; and
   forwarding, by the client computer, the account information to the server computer, wherein the server computer thereafter:

receives a first authorization request message from a merchant for a transaction, wherein the first authorization request message is received in a first format; and sends a second authorization request message for the transaction in a second format to an issuer, wherein the second format is more secure than the first format.

16. The method of claim 15, wherein the server computer creates the second authorization request message by adding a data element to the first authorization request message.

17. The method of claim 16, wherein the server computer determines the data element based upon the account information.

18. The method of claim 15 further comprising receiving, at the client computer, a verification value associated with the forwarded account information from the server computer.

19. The method of claim 15, wherein the client computer uses a verification token to receive the account information from the data storage of the portable device.

20. The method of claim 19, wherein the verification token is embedded in the client computer.

\* \* \* \* \*